United States Patent
Husemann et al.

(10) Patent No.: US 7,514,515 B2
(45) Date of Patent: Apr. 7, 2009

(54) METHOD FOR THE PRODUCTION OF ACRYLATE ADHESIVE MATERIALS USING METAL-SULPHUR COMPOUNDS

(75) Inventors: Marc Husemann, Hamburg (DE); Stephan Zollner, Hamburg (DE)

(73) Assignee: tesa AG, Hamburg (DE)

( * ) Notice: Subject to any disclaimer, the term of this patent is extended or adjusted under 35 U.S.C. 154(b) by 635 days.

(21) Appl. No.: 10/523,095

(22) PCT Filed: Jul. 16, 2003

(86) PCT No.: PCT/EP03/07679

§ 371 (c)(1), (2), (4) Date: Aug. 4, 2005

(87) PCT Pub. No.: WO2004/018582

PCT Pub. Date: Mar. 4, 2004

(65) Prior Publication Data

US 2006/0041044 A1    Feb. 23, 2006

(30) Foreign Application Priority Data

Aug. 13, 2002 (DE) ................... 102 37 000

(51) Int. Cl.
*C08F 118/02* (2006.01)
(52) U.S. Cl. .............. 526/319; 526/219.6; 526/227; 526/229; 526/309; 526/323.2; 526/328.5
(58) Field of Classification Search ............ 526/319, 526/219.6, 227, 229, 309, 323.2, 328.5
See application file for complete search history.

(56) References Cited

U.S. PATENT DOCUMENTS

| | | | |
|---|---|---|---|
| 3,983,057 A | 9/1976 | Illmann et al. | 260/29.6 |
| 6,642,318 B1 | 11/2003 | Chiefari et al. | 525/261 |
| 6,765,078 B2 * | 7/2004 | Husemann et al. | 526/319 |
| 2002/0193539 A1 | 12/2002 | Husemann et al. | 526/217 |
| 2003/0034123 A1 | 2/2003 | Husemann et al. | 156/275.5 |
| 2004/0038061 A1 | 2/2004 | Bargmann et al. | 428/522 |
| 2004/0092685 A1 | 5/2004 | Husemann et al. | 526/217 |
| 2004/0171777 A1 | 9/2004 | Le et al. | 526/286 |

FOREIGN PATENT DOCUMENTS

| | | |
|---|---|---|
| DE | 23 54 680 | 5/1975 |
| DE | 100 14 563 | 10/2001 |
| DE | 100 30 217 | 1/2002 |
| DE | 100 34 069 | 2/2002 |
| DE | 100 36 801 | 2/2002 |
| EP | 0036456 | 9/1981 |
| WO | WO 9801478 | 1/1998 |
| WO | WO 9931144 | 6/1999 |

OTHER PUBLICATIONS

Hans-Georg Elias, Makromoleküle, 5th edition, 1990, Hüthig & Wepf Verlag Basle.
J.-P. Fouassier, Photoinitiation, Photopolymerization and Photocuring, Fundamentals and Applications, Hanser Publishers, Munich, Vienna, New York 1995.
A. Carroy, C. Decker, J.P. Dowling, P. Pappas, B. Monroe, Chemistry & Technology of UV & EB formulation for Coatings, Inks & Paints, vol. 5, ed. By P.K.T. Oldring, publ. By SITA Technology, London, England 1994.
Houben Weyl, Methoden der Organischen Chemie, vol. E 19a, pp. 60-147 1990.
Skelhorne "Electron Beam Processing" vol. 1 "Chemistry & Technology of UV & EB Formulations for Coatings, Inks & Paints" publ. Sita Technology, London 1991 pp. 103-157.
Ullmann's Encyclopedia of Industrial Chemistry, Sixth Edition, vol. 35, Surfactants, Electronic Release, Wiley-VCH, Weinheim 2000.

* cited by examiner

*Primary Examiner*—Robert D. Harlan
(74) *Attorney, Agent, or Firm*—Norris McLaughlin & Marcus PA

(57) ABSTRACT

A process for preparing a pressure-sensitive polyacrylate adhesive, characterized in that a polyacrylate composition including the atomic sequence C—S—C is admixed with at least one metal compound of type $(L)_y M$ where
M=metal atom or metal ion
L=counterion or ligand
y=0 to 6.

11 Claims, No Drawings

METHOD FOR THE PRODUCTION OF ACRYLATE ADHESIVE MATERIALS USING METAL-SULPHUR COMPOUNDS

This is a 371 of PCT/EP03/07679 filed 16 Jul. 2003 (international filing date).

The invention relates to a process for preparing pressure-sensitive acrylate adhesive materials, to pressure-sensitive adhesives (PSAs) thus obtainable, and to their use.

BACKGROUND OF THE INVENTION

For industrial PSA tape applications it is very common to use polyacrylate PSAs. Polyacrylates possess a variety of advantages over other elastomers. They are highly stable toward UV light, oxygen, and ozone. In contrast, synthetic and natural rubber adhesives normally contain double bonds, which make these adhesives unstable to the aforementioned environmental influences.

Another advantage of polyacrylates is their transparency and their usefulness across a relatively wide temperature range.

Polyacrylate PSAs are generally prepared in solution by free radical polymerization. The polyacrylates are generally coated onto the corresponding backing material from solution, using a coating bar, and then dried. In order to increase the cohesion the polymer is crosslinked. Curing proceeds thermally or by UV crosslinking or by EB curing (EB: electron beams). The operation described is relatively costly and environmentally objectionable, since as a general rule the solvent is not recycled and the high consumption of organic solvents represents a high environmental burden.

It is very difficult, moreover, to produce PSA tapes at high coatweight without bubbles.

One remedy for these disadvantages is the hotmelt process. In this process the PSA is applied to the backing material from the melt.

However, this technology has its limitations. Prior to coating, the solvent is removed from the PSA in a drying extruder. The drying operation is associated with a relatively high temperature and shearing effect, so that high molecular weight polyacrylate PSAs in particular are severely damaged. The acrylate PSA gels or the low molecular weight fraction is highly enriched as a result of molecular weight breakdown. Both effects are unwanted, since they are disadvantageous for the application. Either the adhesive can no longer be applied or there are changes in its adhesive properties, since, for example, when a shearing force acts on the adhesive the low molecular weight fractions act as lubricants and so lead to premature failure of the adhesive.

One solution to mitigating these disadvantages is offered by polyacrylate adhesives with a lower average molecular weight and narrow molecular weight distribution. In this case the fraction of low molecular weight and high molecular weight molecules in the polymer is greatly reduced as a result of the polymerization process. The fall in the high molecular weight fractions reduces the flow viscosity, and the adhesive shows less of a tendency to gel. As a result of the lowering of the low molecular weight fraction, the number of oligomers, which reduce the shear strength of the PSA, is lessened.

A variety of polymerization methods are suitable for preparing low molecular weight PSAs. The state of the art is to use regulators, such as alcohols or thiols, for example (Makromoleküle, Hans-Georg Elias, 5th edition, 1990, Hüthig & Wepf Verlag Basle). These regulators reduce the molecular weight but broaden the molecular weight distribution.

Under prolonged thermal exposure, such as is typical of a hotmelt process, however, volatile thiols are released as a result of thermal degradation or shearing, and these thiols have an unpleasant odor.

In the aforementioned publications attempts have been made to improve the control of radical polymerization reactions. There is nevertheless a need for a polymerization process which is highly reactive and allows high conversions to be obtained in conjunction with high molecular weight and low polydispersity. The task of meeting these requirements was taken on in DE 100 36 801.

A further variant for the preparation of polyacrylates is the RAFT (reversible addition-fragmentation chain transfer) process. The process is described at length in WO 9801478 and WO 9931144, but is not suitable in the manner depicted therein for preparing PSAs, since the conversions achieved are very low and the average molecular weight of the polymers prepared is too low for acrylate PSAs. The polymers described cannot, therefore, be employed as acrylate PSAs. An improvement was achieved with the process described in DE 100 30 217.3.

For these processes, however, there continues to be the problem of the odor nuisance caused by volatile thiol compounds, which are still formed by way of thermal decomposition or the effect of shearing.

Furthermore, for the preparation of acrylate PSA tapes, it is generally necessary to crosslink polyacrylates prepared by the above-described processes, using high-energy (actinic) radiation. This process as well (especially as a result of irradiation with electron beams) produces fragments which are composed of thiols and give rise to an unpleasant odor.

The problem of odor nuisance after thermal storage, under shearing, and under actinic radiation in acrylate hotmelt PSAs therefore remains, and therefore closes off a broad application field to the PSAs prepared as described above.

It is an object of the invention, therefore, to provide a process which provides PSAs which in the hotmelt process exhibit a reduced odor behavior, or none at all, under thermal storage, under shearing, and under actinic radiation.

SUMMARY OF THE INVENTION

Surprisingly it has been found that a process using metal-sulfur compounds leads to acrylate hotmelt PSAs which exhibit the desired properties, and that polyacrylate PSA tapes produced from acrylate hotmelt PSAs with metal-sulfur compounds have no odor behavior after hotmelt coating and after crosslinking with actinic irradiation.

The invention accordingly provides a process for preparing pressure-sensitive polyacrylate adhesives which starts from a polyacrylate composition comprising the atomic sequence C—S—C and adds to it at least one metal compound of the type $(L)_y M$, where M represents a metal atom or metal ion, L denotes counterions or ligands, and y is chosen to be from 0 to 6.

One especially suitable version of the process of the invention comprises at least the following steps:

polymerizing a monomer mixture using at least one compound comprising the atomic sequence C—S—C as regulator, additizing with metal compounds of the type $(L)_y M$, concentrating the polymer to form a hotmelt composition, crosslinking the polymer by means of actinic radiation.

DETAILED DESCRIPTION

The process of the invention proceeds in a very advantageous way if there is at least one atomic sequence C—S—C incorporated per polymer chain of the resultant polymer.

For the preparation of acrylate PSAs one preferred procedure of the process of the invention prepares polymers from acrylic esters and/or methacrylic esters and/or their free acids with the following formula

$CH_2=CH(R_1)(COOR_2)$, where $R_1$=H or $CH_3$ and $R_2$ is an alkyl chain having 1-30 carbon atoms or H [monomers a)]. The proportion of the monomers a) in the monomer mixture to be polymerized is advantageously 7%-99.9% by weight, in particular 75%-100% by weight. Additionally it is possible in a preferred procedure for olefinically unsaturated monomers [monomers b)] containing functional groups to be added as comonomers to the monomer mixture to be polymerized. Their proportion is advantageously 0%-30% by weight. The proportions of the monomers a) and of the monomers b) may add up advantageously to 100%, although the total may also be lower, as a result of the addition of further comonomers to the monomer mixture.

In one advantageous procedure use is made as monomers a) of acrylic monomers which comprise acrylic and/or methacrylic esters with alkyl groups composed of 4 to 14 carbon atoms, preferably 4 to 9 carbon atoms. Specific examples, without wishing to be restricted unnecessarily by this enumeration, include n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and their branched isomers, such as 2-ethylhexyl acrylate, for example. Further classes of compound which can be added likewise (but preferably in small amounts) as monomers a) are methyl methacrylates, cyclohexyl methacrylates and isobornyl methacrylates.

In one very preferred version of the process of the invention photoinitiators with at least one vinyl compound are used as monomers b). The photoinitators may advantageously be of Norrish I or Norrish II type. These photoinitiators include as a structural component preferably one or more of the following radicals: benzophenone, acetophenone, benzil, benzoin, hydroxyalkylphenone, phenyl cyclohexyl ketone, anthraquinone, trimethylbenzoylphosphine oxide, methylthiophenyl morpholine ketone, amino ketones, azobenzoins, thioxanthone, hexaarylbisimidazole, triazine, or fluorenone, it being possible for each of these radicals to be additionally substituted by one or more halogen atoms and/or one or more alkoxy groups and/or one or more amino groups and/or one or more hydroxyl groups. A representative overview is given in "Photoinitiation, Photopolymerization and Photocuring, Fundamentals and Applications, by J.-P. Fouassier, Hanser Publishers, Munich, Vienna, New York 1995". For further details it is possible to consult "Chemistry & Technology of UV & EB formulation for Coatings, Inks & Paints, Volume 5, A. Carroy, C. Decker, J. P. Dowling, P. Pappas, B. Monroe, ed. By P. K. T. Oldring, publ. By SITA Technology, London, England 1994".

Examples are acrylated benzophenone, such as Ebecryl P 36™ from UCB for example, or benzoin acrylate.

Monomers which can likewise be used with advantage as monomers b) are vinyl esters, vinyl ethers, vinyl halides, vinylidene halides, and vinyl compounds with aromatic rings and heterocycles in α position. Here again, mention may be made, without exclusion, of some examples: vinyl acetate, vinylformamide, vinypyridine, ethyl vinyl ether, vinyl chloride, vinylidene chloride, and acrylonitrile. In a further very preferred version for the monomers b) monomers containing the following functional groups are used: hydroxyl, carboxyl, epoxy, acid amide, isocyanato or amino groups.

In one advantageous version acrylic monomers are used as monomers b) that correspond to the following general formula:

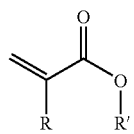

where R=H or $CH_3$ and the radical —OR' represents or includes the functional group and, for example, in one particularly preferred version possesses an H donor effect which facilitates UV crosslinking.

Particularly preferred examples of components b) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glyceridyl methacrylate, benzyl acrylate, benzyl methacrylate, phenyl acrylate, phenyl methacrylate, t-butyl phenylacrylate, t-butylphenyl methacrylate, phenoxyethyl acrlylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethyl-aminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, dimethylacrylic acid, this enumeration not being conclusive.

In one further preferred procedure use is made for component b) of aromatic vinyl compounds, the aromatic cores being composed preferably of $C_4$ to $C_{18}$ hydrocarbon radicals and also being able to contain heteroatoms. Particularly preferred examples are styrene, 4-vinylpyridine, N-vinylphthalimide, methylstyrene, 3,4-dimethoxystyrene, 4-vinylbenzoic acid, this enumeration not being conclusive.

In a further inventive procedure it is also possible to use monomers which contain at least one thioether, thioester or thiocarbonate function.

For the polymerization the monomers are chosen such that the resulting polymers can be used as PSAs with industrial utility, especially such that the resulting polymers possess pressure sensitive adhesion properties in accordance with the "Handbook of Pressure Sensitive Adhesive Technology" by Donatas Satas (van Nostrand, New York 1989). For these applications the static glass transition temperature of the resulting polymer is advantageously below 25° C.

For preparing the polymers it is advantageous to choose radical polymerization processes, although other polymerization processes are not to be excluded from the invention, especially anionic processes.

For radical polymerization use is made preferredly of radical initiator systems, especially thermally decomposing, radical-forming azo or peroxo initiators, or redox systems. In principle, however, any customary initiators known for acrylates are suitable for this purpose. The production of C-centered radicals is described in Houben Weyl, Methoden der Organischen Chemie, Vol. E 19a, pp. 60-147. These methods are preferentially employed analogously.

Examples of radical sources are peroxides, hydroperoxides and azo compounds; a number of nonexclusive examples that may be mentioned here of typical radical initiators include potassium peroxodisulfate, dibenzoyl peroxide, cumene hydroperoxide, cyclohexanone peroxide, di-t-butyl peroxide, azodiisobutyronitile, cyclohexylsulfonyl acetyl peroxide, diisopropyl percarbonate, t-butyl peroctoate, benzpinacol. In one very preferred version a radical initiator used is 1,1'-azobis(cyclohexane carbonitrile) (Vazo 88™ from DuPont).

The polymerization may be conducted in bulk, in the presence of an organic solvent, or in mixtures of organic solvents, in the presence of water, or in mixtures of organic solvents and water. The aim is to minimize the amount of solvent used. Suitable organic solvents or solvent mixtures are simple alkanes (hexane, heptane, octane, isooctane), aromatic hydrocarbons (benzene, toluene, xylene), esters (ethyl, propyl, butyl or hexyl acetate), halogenated hydrocarbons (chlorobenzene), alkanols (methanol, ethanol, ethylene glycol, ethylene glycol monomethyl ether), ethers (diethyl ether, dibutyl ether) or mixtures thereof. A water-miscible or hydrophilic cosolvent may be added to the aqueous polymerization reactions in order to ensure that in the course of monomer conversion the reaction mixture is in the form of a homogeneous phase. Cosolvents which can be used with advantage for the present invention are selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, sulfoxides, sulfones, alcohol derivatives, hydroxy ether derivatives, amino alcohols, ketones and the like, and also derivatives and mixtures thereof.

Of particularly preferred suitability for the preparation of polyacrylates containing at least one thioether function are additions of thiols and/or dithioethers. These compounds act as polymerization regulators. Two examples, without claim to completeness, are dodecanethiol and hexadecanethiol.

Depending on conversion and temperature the polymerization time is between 4 and 72 hours. The higher the reaction temperature that can be chosen, in other words the higher the thermal stability of the reaction mixture, the lower the level at which the reaction time can be chosen.

To initiate the polymerization it is essential to introduce heat in the case of the thermally decomposing initiators. For the thermally decomposing initiators the polymerization can be initiated by heating at 50 to 160° C., depending on initiator time. Alternatively the polymerization can be started using UV light and a UV photoinitiator, in which case the UV photoinitiator gives rise to the formation of radicals which initiate the polymerization. The number of free radicals can be controlled through the UV dose.

For preparing polyacrylates with a polydispersity of less than 3.0 it is preferred to use controlled radical polymerizations.

Regulators used are compounds which exhibit the atomic sequence C—S—C. Particularly suitable for this purpose are organic ethers, esters and carbonates in which at least one of the oxygen atoms, preferably two or more thereof, and with particular preference all of the oxygen atoms, are substituted by sulfur atoms. It is possible if desired for one of or some of the oxygen atoms to be substituted by other heteroatoms as well, such as by nitrogen, for example.

Regulators used with particular advantage are compounds which can be represented by one of the following structures:

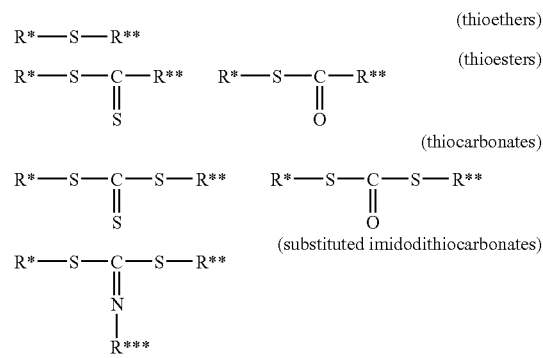

where R*, R, R* independently of one another are aromatic or aliphatic saturated or unsaturated hydrocarbon radicals, which may be present monomerically, oligomerically or polymerically.

For the preparation of at least dithioester-containing polyacrylates it is preferred for the polymerization to use control reagents of the general formula:

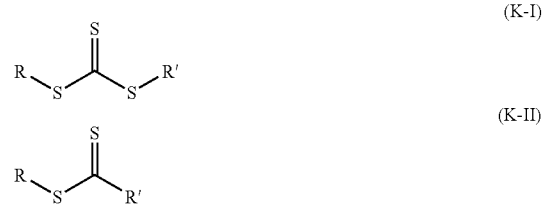

in which
R and R', chosen independently of one another or identically, are
branched and unbranched $C_1$ to $C_{18}$ alkyl radicals; $C_3$ to $C_{18}$ alkenyl radicals; $C_3$ to $C_{18}$ alkynyl radicals;
H or $C_1$ to $C_{18}$ alkoxy
$C_3$ to $C_{18}$ alkynyl radicals; $C_3$ to $C_{18}$ alkenyl radicals; $C_1$ to $C_{18}$ alkyl radicals substituted by at least one OH group or one halogen atom or one silyl ether;
$C_2$-$C_{18}$ heteroalkyl radicals having at least one oxygen atom and/or one NR' group in the carbon chain
$C_3$-$C_{18}$ alkynyl radicals, $C_3$-$C_{18}$ alkenyl radicals, $C_1$-$C_{18}$ alkyl radicals substituted by at least one ester group, amine group, carbonate group, cyano, isocyano and/or epoxide group and/or by sulfur;
$C_3$-$C_{12}$ cycloalkyl radicals
$C_6$-$C_{18}$ aryl radicals or benzyl radicals
hydrogen.

Control reagents of type (K-I) are composed in one advantageous procedure of compounds having the following characteristics:
halogens are preferably F, Cl, Br or I, more preferably Cl and Br.
As alkyl, alkenyl and alkynyl radicals in the various substituents use is made advantageously of linear and also branched chains.
Examples that may be mentioned of alkyl radicals containing 1 to 18 carbon atoms include methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl and octadecyl.

Examples of alkenyl radicals having 3 to 18 carbon atoms are propenyl, 2-butenyl, 3-butenyl, isobutenyl, n-2,4-pentadienyl, 3-methyl-2-butenyl, n-2-octenyl, n-2-dodecenyl, isododecenyl and oleyl.

Examples of alkynyl having 3 to 18 carbon atoms are propynyl, 2-butynyl, 3-butynyl, n-2-octynyl and n-2-octadecynyl.

Examples of hydroxy-substituted alkyl radicals are hydroxypropyl, hydroxybutyl or hydroxyhexyl.

Examples of halogen-substituted alkyl radicals are dichlorobutyl, monobromobutyl or trichlorohexyl.

A suitable $C_2$-$C_{18}$ heteroalkyl radical having at least one oxygen atom in the carbon chain is for example —$CH_2$—$CH_2$—O—$CH_2$—$CH_3$.

Examples of $C_3$-$C_{12}$ cycloalkyl radicals used include cyclopropyl, cyclopentyl, cyclo-hexyl or trimethylcyclohexyl.

Examples of $C_6$-$C_{18}$ aryl radicals used include phenyl, naphthyl, benzyl, 4-tert-butyl-benzyl- or further substituted phenyl, such as ethyl, toluene, xylene, mesitylene, isopropylbenzene, dichlorobenzene or bromotoluene.

The listings above serve only as examples with the respective groups of compounds, and possess no claim to completeness.

Compounds of the following types are also suitable, moreover, as control reagents

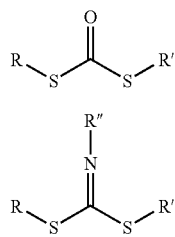

(K-III)

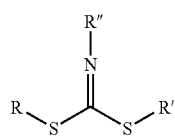

(K-IV)

where R and R' are as defined above and R″ may likewise comprise the aforementioned radicals R or R', independently of their selection.

In one particularly preferred embodiment of the invention compounds (K-Ia) and (K-IIa) are used as control reagents.

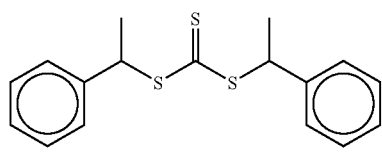

(K-Ia)

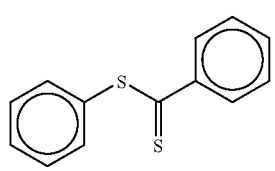

(K-IIa)

At least one metal compound of type $(L)_yM$ is added to the polyacrylate composition, where M represents a metal atom or metal ion, L represents counterions or ligands and y is chosen as from 0 to 6. The metal compound used is preferably a metal salt, a metal hydroxide or a metal complex compound.

Highly suitable metals M are those which are very suitable as central atoms or central ions in metal complexes. With great advantage the metal M is selected from the following group:

copper, nickel, iron, zinc, tin, cadmium, aluminum, cobalt, silver, gold, palladium, platinum, ruthenium, rhodium, osmium, iridium, manganese and rhenium.

Rare earth metals can also be among the metals used.

The counterions and/or ligands L may be chosen with advantage, independently of one another, from the following group:

halides, alkoxides, borides, hydroxides, nitrates, phosphates, perchlorates, phthalocyanines, oxinates, acetates, acetylacetonates, carbonates, formates, cyanides, naphthalocyanines, thiocyanates, carboxylates, chelates, resinates, carbides, phosphines, alkyls, alkenyls, alkynyls, diones, aryls, substituted aryls, citrates, heterocycles, pentadienyl, amines, polyfunctional amines, ethers, crown ethers.

As L it is also possible, however, to use other counterions and/or ligands. In particular it is advantageous if (for example, as a result of the M-L bond energy) the addition of sulfur-containing ligands and/or substitution by sulfur-containing ligands is assisted.

In principle the metal compound of type $(L)_y$-M can be added at a freely selectable point in time in the sequence of the invention, but preferably after the polymerization and before subsequent crosslinking. For the inventive process it is particularly advantageous if the metal compound is added before the hotmelt process or during the hotmelt process to the polyacrylate containing the regulator.

The addition can be made in solution or in the melt. Thio compounds which come about through shearing or as a result of thermal loads can be reacted in this way with the metal compounds of type $(L)_y$-M and can therefore form the inventive polyacrylate PSAs with compounds of type $(L)_z$-M-$(SR)_x$. The reaction may in this case appear such that the metal occupies additional coordination sites or that some or all of the y ligands or counterions L are replaced. The number of coordination sites occupied per L may change.

The monomer mixture or the polymer may be admixed before, during or after the polymerization with (further) various additives.

For the use of the polymers (polyacrylates) as PSAs it is advantageous, for the purpose of optimization, to admix at least one resin. As tackifying resins for addition it is possible to use all of the tackifier resins already known and described in the literature. As representatives mention may be made of pinene resins, indene resins and rosins, their disproportionated, hydrogenated, polymerized, esterified derivatives and salts, the aliphatic and aromatic hydrocarbon resins, terpene resins and terpene-phenolic resins, and C5, C9 and other hydrocarbon resins. Any desired combinations of these and further resins may be used in order to adjust the properties of the resulting adhesive in accordance with what is desired. Generally speaking it is possible to use any resins which are compatible with (soluble in) the corresponding polyacrylate, reference being made in particular to all aliphatic, aromatic and alkylaromatic hydrocarbon resins, hydrocarbon resins based on single monomers, hydrogenated hydrocarbon resins, functional hydrocarbon resins and natural resins. Express reference is made to the depiction of the state of knowledge in the "Handbook of Pressure Sensitive Adhesive Technology" by Donatas Satas (van Nostrand, 1989).

In a further advantageous development one or more plasticizers are added to the polyacrylates, such as low molecular weight polyacrylates, phthalates, water-soluble plasticizers or plasticizing resins, for example.

The polyacrylates may additionally be blended with one or more additives such as aging inhibitors, light stabilizers, ozone protectants, fatty acids, resins, nucleators, expandants, compounding agents and/or accelerators. For the aging inhibitors reference may be made in particular to primary and secondary aging inhibitors, which are available commercially under the trade names Irganox™ from Ciba Geigy and Hostanox™ from Clariant.

They may further be admixed with one or more fillers such as fibers, carbon black, zinc oxide, titanium dioxide, solid or hollow glass (micro)balls, microballs of other materials, silica, silicates and chalk, the addition of blocking-free isocyanates being a further possibility.

To promote a subsequent crosslinking step it is possible with advantage to admix crosslinker substances to the polyacrylates. Preferred substances which crosslink under (actinic) radiation are, for example, difunctional or polyfunctional acrylates or difunctional or polyfunctional urethane acrylates, difunctional or polyfunctional isocyanates or difunctional or polyfunctional epoxides. Use may also be made here, however, of any further difunctional or polyfunctional compounds which are familiar to the skilled worker and are capable of crosslinking polyacrylates.

In order to improve the crosslinking efficiency it is possible if desired to blend the polyacrylates instead or additionally with photoinitiators. Suitable for this purpose with preference are Norrish type I and type II cleaving compounds; a number of examples that may be mentioned, nonconclusively, of both classes include the following: benzophenone, acetophenone, benzil, benzoin, hydroxyalkylphenone, phenyl cyclohexyl ketone, anthraquinone, thioxanthone, triazine or fluorenone derivatives. A representative overview is given for example in "Photoinitiation, Photopolymerization and Photocuring, Fundamentals and Applications, by J.-P. Fouassier, Hanser Publishers, Munich, Vienna, New York 1995" and "Chemistry & Technology of UV & EB Formulation for Coatings, Inks & Paints, Volume 5, A. Carroy, C. Decker, J. P. Dowling, P. Pappas, B. Monroe, ed. by P. K. T. Oldring, publ. By SITA Technology, London, England 1994".

In a further development of the inventive process the polymer is concentrated to a hotmelt after the polymerization, which is operated preferably to a conversion of >98%, the solvent advantageously being stripped off to a maximum residual content of 0.1%, so that the polymer is in the form of a melt.

The solvent is preferably stripped off under reduced pressure in a concentrating extruder, for which purpose use may be made, for example, of single-screw or twin-screw extruders, which preferably distill off the solvent in different or the same vacuum stages and possess a feed preheater.

The addition of crosslinker substances and/or photoinitiators may be made with advantage shortly before the crosslinking step, in other words to the melt.

In one advantageous way of working the process of the invention the polymer is processed further from the melt, in particular by being coated gel-free onto a backing ("gel-free" denotes compliance with the requirements for coatability of the compositions using the coating apparatus which is customarily used and is familiar to the skilled worker for these purposes, in particular for a coating which is distinguished by a uniform (homogeneous) appearance without inhomogeneities or streaks when coating takes place through the coating nozzles that are normally used).

Examples of suitable backing material include the materials familiar to the skilled worker, such as films (for example, polyesters, PET, PE, PP, BOPP, PVC), nonwovens, foams, woven fabrics, woven films, release paper (for example glassine, HDPE, LDPE).

In a further step the polyacrylate composition prepared in accordance with the invention may undergo a crosslinking reaction, in particular under the influence of actinic radiation. The crosslinking may be carried out with the uncoated pressure-sensitive adhesive, although particular advantage attaches to crosslinking after it has been coated onto a backing.

In one inventive process irradiation is carried out with UV light, with the added or copolymerized UV photoinitiator assisting the formation of volatile thiols and accelerating it. The UV irradiation also crosslinks the polyacrylate on the backing material.

UV irradiation takes place very preferably by means of brief ultraviolet irradiation in a wavelength range from 200 to 450 nm, especially using high or medium pressure mercury lamps with an output of from 80 to 240 W/cm. For UV crosslinking it is, however, also possible to use monochromatic radiation in the form of lasers. In order to prevent instances of overheating it may be appropriate to shade off part of the UV beam path. It is also possible to use special reflector systems which act as cold light emitters, in order thereby to prevent overheating.

In one particularly preferred inventive process the polyacrylate described is irradiated with electron beams. Typical irradiation equipment which may be used includes linear cathode systems, scanner systems or segmented cathode systems, where electron beam accelerators are concerned. A detailed description of the state of the art and of the major process parameters can be found in Skelhorne "Electron Beam Processing" in Vol. 1 "Chemistry & Technology of UV & EB Formulations for Coatings, Inks & Paints" publ. Sita Technology, London 1991. The typical acceleration voltages are situated in the range between 50 kV and 500 kV, preferably 80 kV to 300 kV. The radiation doses employed range between 5 to 150 kGy, in particular 20 to 100 kGy.

Thiol fragments formed in situ during electron bombardment may react within the polyacrylate with the compounds of type $(L)_y$-M and so form, in the inventive process, in situ, compounds of type $(L)_y$-M-$(SR)_x$ within the polymer matrix.

In a further version of the invention the polyacrylate is coated onto a roller which is provided with a contact medium and is crosslinked on said contact medium with actinic irradiation. Further information on this process can be found in DE 100 14 563 and DE 100 34 069.

The crosslinking unit may be combined with a cooling unit for the hotmelt PSA; in other words, cooling may be carried out advantageously during crosslinking. One preferred embodiment of an apparatus for the inventive process provides for this purpose a rotating roller; in one very preferred variant a chill roll is utilized.

As a result of crosslinking using a chill roll it is possible to choose substantially higher levels of the radiation doses that are needed for crosslinking, especially in the case of electron beam crosslinking, than in the case of conventional crosslinking methods.

Where crosslinking of the PSA is not envisaged it may also be found useful to pass the PSA through a cooling unit, and in particular to lay it onto a cooled roller.

A contact medium may have been applied, advantageously, to the roller, and may be removed again at least in part, where appropriate, after irradiation has taken place with actinic radiation.

In one very advantageous process the contact medium comprises substances of type $(L)_yM$, which are then transferred via the contact medium into the polyacrylate.

The contact medium in this case can be applied either to the reverse of the PSA layer or to the chill roll; it is, however, likewise possible for the contact medium to be applied without contact, such as by spraying, for example.

The chill roll used is usually a grounded metal roller which absorbs the electrons which impinge in the case of electron beam crosslinking and the X-radiation that is formed in the process. It must be equipped with an effective cooling system in order to transport away the considerable quantities of heat. In order to prevent corrosion this roller is commonly coated with a protective coat. The latter is preferably selected so that it is well wetted by the contact medium. In general the surface is electrically and/or thermally conductive. It may, however, also be more advantageous to coat the roll with one or more coats of insulating or semiconducting material. Moreover, the cooling function should be very pronounced, in order to stabilize the PSA foam. Consequently, in one preferred procedure, cooling takes place down to temperatures below 25° C., in a very preferred procedure to temperatures below 5° C.

The contact medium used can be a material which is capable of producing contact between the PSA and the roller surface, in particular a material which fills out the hollows between the textured PSA layer and the surface of the roller.

Suitable materials for this purpose are flowable materials which can be used within a wide viscosity range. Additionally it is possible to use soft, "conforming" materials as the contact medium. On the one hand it is possible with preference to use soft-elastic materials, such as soft rubber, plasticized PVC, other plasticized polymers and similar materials, for example. If these are firmly connected to the chill roll they must possess sufficient radiation stability and must also have sufficient thermal and electrical conductivity.

It is particularly advantageous not to leave the contact medium permanently on the roller but instead to apply it to the roller before the irradiation operation and to remove it from the roller again after the irradiation operation. In one further advantageous embodiment the contact is in the form of a replaceable jacket on the roller. The contact medium can be changed during the irradiation operation (continuous change) or between the individual irradiation operations (discontinuous change). The continual replacement prevents the contact medium being so greatly impaired by the ongoing irradiation that it loses its function.

Advantageously the contact medium used comprises a liquid which, if desired, acquires additives for additional functions. These include increasing the wetting and electrical conductivity and also scavenging radicals and other reactive species which are generated by the absorbed radiation.

As a contact liquid it is possible with advantage to use water, which fulfills the required functions. In a further variant substances at least partly soluble in the contact medium are added to said medium. In the case of water as the contact medium appropriate additives include, for example, alkyl alcoholates such as ethanol, propanol, butanol, hexanol. Also very advantageous are, in particular, relatively long-chain alcohols, polyglycols, ketones, amines, carboxylates, sulfonates and the like.

Advantageous contact media possess a low surface tension. A reduction in the surface tension can be achieved by adding small amounts of nonionic and/or anionic and/or cationic surfactants to the contact medium. In the simplest case use may be made for this purpose of commercial liquid detergents or soap solutions, preferably in a concentration of a few g/l in water as contact medium. Particular suitability is possessed by special surfactants, which can also be used at low concentration. Mention may be made here, for example, of sulfonium surfactants [e.g., β-di(hydroxyalkyl)sulfonium salt], and also for example of ethoxylated nonylphenyl-sulfonic acid ammonium salts. Reference may be made here in particular to the state of the art under "surfactants" in Ullmann's Encyclopedia of Industrial Chemistry, Sixth Edition, 2000 Electronic Release, Wiley-VCH, Weinheim 2000.

As contact media it is also possible to use the aforementioned liquids without the addition of water, in each case alone or in combination with one another.

To improve the properties of the contact medium (for example, to increase the shearing resistance, reduce the transfer of surfactants or the like to the surface of the liner, and hence to provide improved cleaning possibilities for the end product) it is additionally possible with advantage to add salts, gels and similar viscosity-increasing additives to the contact medium and/or to the additives employed.

In the case of a liquid contact medium one possible outstanding procedure is that wherein a second roller, advantageously having a wettable or absorbent surface, runs through a bath containing the contact medium, in doing so is wetted or impregnated with the contact medium and, by contact with the chill roll, applies a film of said contact medium.

After the crosslinking, the structured PSAs are preferably applied to a backing material or laminated with a further PSA.

The guided supply of the backing materials can advantageously be performed under a certain contact pressure. This reduces the likelihood of air bubbles being included between the PSA and the backing. It is also possible to limit the amount of contact liquid to the necessary degree.

The contact pressure can be achieved by setting appropriate web tension or by applying pressure using a (further) roller. In the latter case the surface of the contact roller ought to have a sufficient release effect, so that the PSA layer on the surface of the backing does not stick to the roller.

Further methods for contact pressure are, for example, the use of air jets or air cushions or the utilization of electrostatic forces.

In an alternative procedure the PSA can be placed directly, on emergence from the nozzle, onto a permanent backing material and, if desired, can be crosslinked thereon.

The invention further provides an acrylate-based pressure-sensitive adhesive which includes a measurable fraction of metal-sulfur compounds of the general structure $(L)_z$-M-$(SR)_x$, the symbols being as defined above. Advantageously this is a pressure-sensitive adhesive which has been obtained or is obtainable by one of the processes above. The pressure-sensitive adhesive may be in crosslinked or noncrosslinked form.

In one preferred embodiment the polymers possess an average molecular weight $M_w$ (weight average) of at least 100 000 g/mol, in particular between 100 000 and 2 000 000 g/mol, these molecular weights being determined by gel permeation chromatography (GPC), measured against PMMA standards, and using, as the eluent, tetrahydrofuran containing 0.1% by weight trifluoroacetic acid. Alternatively the molecular weight can be determined by way of matrix-assisted laser desorption/ionization-mass spectrometry (MALDI-MS) or light scattering.

In one preferred embodiment the PSA has a polydispersity $D=M_w/M_n$ of not more than 3.0 ($M_n$: average molecular weight; number average).

Further provided by the invention is the use of an acrylate-based pressure-sensitive adhesive which includes a measurable fraction of metal-sulfur compounds of the general structure $(L)_z$-M-$(SR)_x$ for an adhesive tape provided with pressure-sensitive adhesive on one or both sides or for a single-sidedly or double-sidedly coated adhesive body of another form, such as adhesive sheets, adhesive labels, etc.

In particular the pressure-sensitive adhesive is applied to one or both sides of a backing. Application in this case takes place advantageously, in the crosslinked or in the uncrosslinked state, from the melt; as backing material great suitability is possessed, for example, by materials which are familiar to the skilled worker, such as films (for example, polyesters, PET, PE, PP, BOPP, PVC), nonwovens, foams, woven fabrics, woven films, release paper (for example, Glassine, HDPE, LDPE).

EXAMPLES

Test Methods

The following test methods were employed for evaluating the adhesive properties and general properties of the PSAs prepared.

180° Bond Strength Test (Test A)

A strip 20 mm wide of an acrylate PSA applied as a layer to polyester was applied to steel plates. The PSA strips were pressed onto the substrate twice using a 2 kg weight. The adhesive tape was subsequently peeled from the substrate immediately at an angle of 180° and at 300 mm/min. The steel plates had been washed before and, twice with acetone and once with isopropanol. The results are reported in N/cm and are averaged from three measurements. All measurements were conducted at room temperature.

Measurement of Outgassing Test (Test B):

The volatile constituents were determined via GC-MS. The instruments used were as follows:

GC: Hewlett Packard HP 5890 SERIES 11 MS: Hewlett Packard HP 5989 A For the measurement a DB-5 column was installed with a length of 60 m, an internal diameter of 0.25 mm and a film thickness of 1 µm. Measurement took place with a temperature program of 50° C. (3 min)-150° C./min-260° C. (2 min). The carrier gas used was hydrogen (90 kPa) with a flow rate of 1 ml/min. The split ratio was 1:10.

Preparation of the Specimens:

The adhesives were coated onto PET film in a hotmelt process. The coatweight was approximately 50 g/m². Before or after UV irradiation a sample surface of about 40 cm² was cut from the swatch specimen, scattered with glass beads (diameter: 60-80 µm) and rolled up and transferred into a 25 ml headspace vial. The sample was baked at 100° C. for 1 h and finally the volatile constituents were injected from the vapor space into the GC.

Quantification took place against external standards.

Gel Permeation Chromatograph GPC (Test C)

The average molecular weight $M_w$ and the polydispersity PD were determined via gel permeation chromatography. The eluent used was THF containing 0.1% by volume trifluoroacetic acid. Measurement was carried out at 25° C. The precolumn used was PSS-SDV, SDV, 5µ, $10^3$ Å, ID 8.0 mm×50 mm. Separation was carried out using the columns PSS-SDV, 5µ, $10^3$ and $10^5$ and $10^6$ in each case of ID 8.0 mm×300 mm. The sample concentration was 4 g/l, the flow rate 1.0 ml per minute. Measurement was carried out against PMMA standards.

Determination of the Gel Fraction (Test D)

The carefully dried, solvent-free adhesive samples are welded into a pouch of polyethylene nonwoven (commercial Tyvek web). From the difference in the sample weights before and after extraction with toluene the gel index is determined, i.e., the weight fraction of polymer that is not soluble in toluene.

Practical Procedures:

Implementation of the Hotmelt Process in a Recording Extruder (Method E):

The acrylate hotmelt process was simulated in the Rheomix 610p recording extruder from Haake. The drive unit available was the Rheocord RC 300p device. The instrument was controlled using the PolyLab system software. The extruder was charged in each case with 52 g of solvent-free acrylate PSA (~80% fill level). The experiments were conducted with a kneading temperature of 120° C., a rotary speed of 40 rpm and a kneading time of 24 hours. Thereafter the samples were coated at a rate of 50 g/m² onto a PET film, 23 µm thick and provided with a Saran primer, using a hotmelt coater with two heatable rollers.

UV Irradiation

UV irradiation was carried out using a UV unit from Eltosch. The unit is equipped with a medium pressure Hg-UV lamp with an intensity of 120 W/cm. The swatch samples were each passed through the unit at a speed of 20 m/min, and were irradiated in a plurality of passes in order to increase the irradiation dose. The UV dose was measured using the Power-Puck from Eltosch. The dose of one irradiation pass was approximately 140 mJ/cm² in the UV-B range and 25 mJ/cm² in the UV-C range.

Electron Beam Irradiation

Irradiation with electrons took place using an instrument from Electron Crosslinking AB, Halmstad, Sweden. The PSA tape specimen for irradiation was guided via the chill roll, present as standard, beneath the Lenard window of the accelerator. Within the irradiation zone the atmospheric oxygen was displaced by flushing with pure nitrogen. The outspeed was in each case 10 m/min.

Synthesis of the Polymerization Regulator:

Preparation of bis-2,2'-phenylethyl thiocarbonate (Ia)

Bis-2,2'-phenylethyl thiocarbonate was synthesized starting from 2-phenylethyl bromide with carbon disulfide and sodium hydroxide in accordance with a specification from Synth. Communications 18 (13), pp. 1531-1536, 1988. Yield after distillation: 72%.

Characterization: $^1$H-NMR (CDCl$_3$) δ (ppm): 7.20-7.40 (m, 10H), 1.53, 1.59 (2×d, 6H), 3.71, 3.81 (2×m, 2H).

Preparation of the Polymers

Polymer 1:

A 2 L glass reactor conventional for radical polymerizations was charged with 20 g of acrylic acid, 380 g of n-butyl acrylate, 0.55 g of bis-2,2'-phenylethyl thiocarbonate and 170 g of acetone. After nitrogen gas had been passed through the reactor for 45 minutes with stirring the reactor was heated to 58° C. and 0.2 g of azoisobutyronitrile (AIBN, Vazo 64™, DuPont) was added. Subsequently the external heating bath was heated to 75° C. and the reaction was carried out constantly at this external temperature. After a reaction time of 1 hour a further 0.2 g of AIBN was added. After 4 h and 8 h dilution took place with 100 g of acetone each time. The reaction was terminated after a time of 48 h and cooled to room temperature. The average molecular weight and the polydispersity were determined by means of test C.

The polymer was concentrated in a vacuum drying oven at 80° C. and a pressure of 10 torr.

Polymer 2:

A 2 L glass reactor conventional for radical polymerizations was charged with 20 g of acrylic acid, 380 g of n-butyl acrylate, 0.55 g of bis-2,2'-phenylethyl thiocarbonate and 170 g of acetone. After nitrogen gas had been passed through the reactor for 45 minutes with stirring the reactor was heated to 58° C. and 0.2 g of azoisobutyronitrile (AIBN, Vazo 64™, DuPont) was added. Subsequently the external heating bath was heated to 75° C. and the reaction was carried out constantly at this external temperature. After a reaction time of 1 hour a further 0.2 g of AIBN was added. After 4 h and 8 h dilution took place with 100 g of acetone each time. The reaction was terminated after a time of 48 h and cooled to room temperature. In the course of the cooling operation 0.5% by weight of benzophenone was incorporated by stirring. The average molecular weight and the polydispersity were determined by means of test C.

The polymer was concentrated in a vacuum drying oven at 80° C. and a pressure of 10 torr.

Polymer 3:

A 2 L glass reactor conventional for radical polymerizations was charged with 20 g of acrylic acid, 380 g of n-butyl acrylate, 0.5 g of dodecanethiol and 266 g of acetone. After nitrogen gas had been passed through the reactor for 45 minutes with stirring the reactor was heated to 58° C. and 0.2 g of azoisobutyronitrile (AIBN, Vazo 64™, DuPont) was added. Subsequently the external heating bath was heated to 75° C. and the reaction was carried out constantly at this external temperature. After a reaction time of 1 hour a further 0.2 g of AIBN was added. After 4 h and 8 h dilution took place with 100 g of acetone each time. After 8 h and after 10 h the residual initiators were reduced by addition in each case of 0.6 g of bis(4-tert-butylcyclohexanyl) peroxydicarbonate (Perkadox 16™, Akzo Nobel). The reaction was terminated after a time of 24 h and cooled to room temperature. The average molecular weight and the polydispersity were determined by means of test C.

EXAMPLES

Example 1

Reference

Polymer 1 was concentrated in a vacuum drying oven at 80° C. and a pressure of 10 torr. Subsequently in accordance with method E the hotmelt process was carried out and coating took place. The coated samples were lined with a siliconized release paper from Laufenberg and then crosslinked with electron beams at 50 kGy with a 180 kV acceleration voltage (see Electron Beam Irradiation). Analysis was carried out using test methods A, B and D.

Example 2

Reference

Polymer 2 was concentrated in a vacuum drying oven at 80° C. and a pressure of 10 torr. Subsequently in accordance with method E the hotmelt process was carried out and coating took place. The coated samples were lined with a siliconized release paper from Laufenberg and then crosslinked with electron beams at 50 kGy with a 180 kV acceleration voltage (see Electron Beam Irradiation). Analysis was carried out using test methods A, B and D.

Example 3

Polymer 1 was blended with 2% by weight of zinc resinate and concentrated in a vacuum drying oven at 80° C. and a pressure of 10 torr. Subsequently in accordance with method E the hotmelt process was carried out and coating took place. The coated samples were lined with a siliconized release paper from Laufenberg and then crosslinked with electron beams at 50 kGy with a 180 kV acceleration voltage (see Electron Beam Irradiation). Analysis was carried out using test methods A, B and D.

Example 4

Polymer 2 was blended with 2% by weight of zinc resinate and concentrated in a vacuum drying oven at 80° C. and a pressure of 10 torr. Subsequently in accordance with method E the hotmelt process was carried out and coating took place. The coated samples were lined with a siliconized release paper from Laufenberg and then crosslinked with electron beams at 50 kGy with a 180 kV acceleration voltage (see Electron Beam Irradiation). Analysis was carried out using test methods A, B and D.

Example 5

Polymer 2 was blended with 2% by weight of zinc resinate and concentrated in a vacuum drying oven at 80° C. and a pressure of 10 torr. Subsequently in accordance with method E the hotmelt process was carried out and coating took place. The coated specimens were irradiated open with UV light (see UV irradiation). Analysis was carried out using test methods A, B and D.

Example 6

Polymer 3 was blended with 2% by weight of zinc resinate and concentrated in a vacuum drying oven at 80° C. and a pressure of 10 torr. Subsequently in accordance with method E the hotmelt process was carried out and coating took place. The coated samples were lined with a siliconized release paper from Laufenberg and then crosslinked with electron beams at 50 kGy with a 180 kV acceleration voltage (see Electron Beam Irradiation). Analysis was carried out using test methods A, B and D.

Results

Listed below in table 1 are the molecular weight data measured by GPC according to test method C:

TABLE 1

|  | $M_W$ [g/mol] | Polydispersity PD |
|---|---|---|
| Polymer 1 | 365 000 | 2.2 |
| Polymer 2 | 388 000 | 2.1 |
| Polymer 3 | 422 000 | 3.5 |

$M_W$: average molecular weight from GPC
PD: $M_W/M_N$ = polydispersity from GPC Examples 1 and 2 were prepared as reference specimens. These reference specimens were synthesized in a trithiocarbonate-regulated polymerization and then crosslinked, unadditized, with electron beams. Examples 3 and 4 were likewise prepared by a trithiocarbonate-regulated polymerization, but blended with zinc resinate and then irradiated with electron beams. Example 5 was prepared according to the same principle but crosslinked with UV radiation. Finally, example 6 saw the preparation of a thioether-containing polymer, which was blended with zinc resinate and then irradiated with electron beams.

The odor was characterized by carrying out GC headspace measurements (test method B) and characterizing the volatile fractions which form. Examples 1 and 2, which have a very poor odor, exhibit a notable fraction of butanethiol and higher homologs. The formation of this compound can easily explain the poor odor of examples 1 and 2 after EB irradiation. Therefore, using test method 2, the liberated fraction of the butanethiol was determined and comparisons were made with one another within examples 1 to 6. The results of these GC investigations are listed in table 2.

TABLE 2

| Example | Volatile fractions of butanethiol [µg/g] |
|---|---|
| 1 | 55 |
| 2 | 75 |
| 3 | n.d. |
| 4 | n.d. |
| 5 | n.d. |
| 6 | n.d. | n.d. = not detectable

The results make it clear that the fraction of butanethiol is reduced significantly by blending with zinc resinate after irradiation. The butanethiol reacts with the zinc resinate and forms a stable zinc sulfide complex which possesses a very low volatility and remains in the polymer. The various examples 3 to 6 demonstrate that not only trithiocarbonate-regulated polymer and thiol-regulated polymers but also polymers which have undergone UV and EB irradiation no longer exhibit any odor, so that (preferably as a result of scavenging by the metal, i.e., as a result of formation of the zinc thiol compound) free thiols are not emitted in any case, and no foul-smelling odor is caused. In order to be certain whether such polymers can also be used as pressure-sensitive adhesives, the degree of crosslinking of the PSAs and also their immediate bond strength to steel were determined. The results are summarized in table 3.

TABLE 3

| Example | BS-steel [N/cm] | Gel index [%] |
|---|---|---|
| 1 | 3.2 | 70 |
| 2 | 3.0 | 74 |
| 3 | 3.5 | 65 |
| 4 | 3.7 | 54 |
| 5 | 3.4 | 64 |
| 6 | 3.5 | 60 |

BS: immediate bond strength to steel
Coatweight 50 g/m²

The gel index values measured demonstrate that examples 1 to 6 have undergone marked crosslinking and, with their degree of crosslinking of more than 50%, are situated within a normal range. This also corresponds to the bond strengths. For examples 3 to 6 somewhat higher bond strengths were measured in comparison with examples 1 and 2.

We claim:

1. A process for preparing a pressure-sensitive polyacrylate adhesive, wherein
   a polyacrylate composition including the atomic sequence C—S—C is admixed with at least one metal compound of formula $(L)_y M$ where
   M=metal atom or metal ion
   L=counterion or ligand selected from the group consisting of halides, alkoxides, borides, hydroxides, nitrates, phosphates, perchlorates, phthalocyanines, oxinates, acetates, acetylacetonates, carbonates, formates, cyanides, naphthalocyanines, rhodanides, thiocyanates, carboxylates, chelates, resinates, carbides, phosphines, alkyls, alkenyls, alkynyls, diones, aryls, substituted aryls, citrates, heterocycles, pentadienyl, amines, polyfunctional amines, ethers, and crown ethers
   y=0 to 6.

2. The process of claim 1, comprising at least the following steps:
   polymerizing a monomer mixture using at least one compound including the atomic sequence C—S—C as regulator, to form a polyacrylate composition which includes the atomic sequence C—S—C,
   additizing with metal compounds of formula $(L)_y M$,
   concentrating the resulting polyacrylate composition to form a hotmelt composition,
   crosslinking the hotmelt composition by means of actinic radiation.

3. The process of claim 1 or 2, wherein
   the compound comprising the atomic sequence C—S—C is a compound represented by one of the following structures:

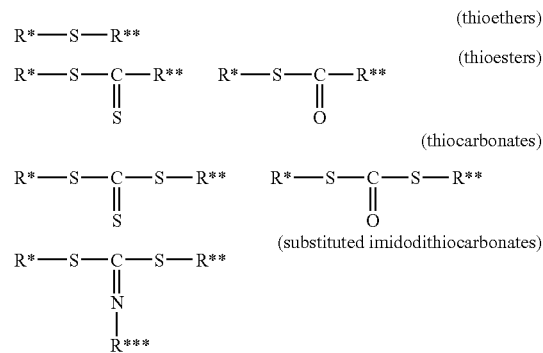

where R*, R and R* independently of one another are aromatic or aliphatic saturated or unsaturated hydrocarbon radicals.

4. The process of claim 3, wherein
   the radicals R*, R and/or R* are present wholly or partly in oligomeric and/or polymeric form.

5. The process of claim 1 or 2, wherein
   the metal compound $(L)_y M$ is a metal salt, a metal hydroxide or a metal complex compound.

6. The process of claim 2, wherein
   the hotmelt composition is applied to a backing material prior to crosslinking.

7. The process of claim 1 or 2, wherein
   the polyacrylate composition is based at least 50% by weight on acrylic monomers.

8. The process of claim 1 or 2, wherein
the polyacrylate composition is based at least partly on monomers of the formula $$CH_2=CH(R^1)(COOR^2)$$

where
$R^1$=H or $CH_3$
$R^2$=H or a hydrocarbon radical containing 1 to 30 carbon atoms.

9. The process of claim 1 or 2, wherein
the metal M is selected from the group consisting of copper, nickel, iron, zinc, tin, cadmium, aluminum, cobalt, silver and gold.

10. A polyacrylate-based pressure-sensitive adhesive, comprising at least one metal-sulfur compound of the structure $$(L)_z\text{-}M\text{-}(SR)_x,$$

where
M represents a metal selected from the group consisting of Cu, Ni, Fe, Zn, Cd, Al, Co, Ag and Au,
R independently at each occurrence denotes aliphatic, aromatic, saturated, unsaturated, oligomeric or polymeric radicals,
L independently at each occurrence represents ions or ligands selected from the group consisting of halides, alkoxides, borides, hydroxides, nitrates, phosphates, perchlorates, phthalocyanines, oxinates, acetates, acetylacetonates, carbonates, formates, cyanides, naphthalocyanines, thiocyanates, carboxylates, chelates, resinates, carbides, phosphines, alkyls, alkenyls, alkynyls, diones, aryls, substituted aryls, citrates, heterocycles, pentadienyl, amines, polyfunctional amines, ethers and crown ethers.

11. The pressure-sensitive adhesive of claim 10, comprising at least 25 ppm, based on the parent polymer, of metal-sulfur compounds of the formula $(L)_z\text{-}M\text{-}(SR)_x$.

* * * * *